United States Patent [19]
Rudolph et al.

[11] Patent Number: 6,147,315
[45] Date of Patent: Nov. 14, 2000

[54] AUTOMOBILE STEERING WHEEL SWITCH

[75] Inventors: Gerd Rudolph, Aspisheim;
Hans-Günter Weiss, Worms, both of Germany

[73] Assignee: Eaton Corporation, Cleveland, Ohio

[21] Appl. No.: 09/289,926

[22] Filed: Apr. 9, 1999

[30] Foreign Application Priority Data

May 2, 1998 [DE] Germany .................. 198 19 695

[51] Int. Cl.[7] ................................. H01H 9/00
[52] U.S. Cl. ..................... 200/61.54; 200/61.55
[58] Field of Search .............. 200/61.54–61.56; 280/728.1, 728.2, 731, 743.1; 307/10.1

[56] References Cited

U.S. PATENT DOCUMENTS

| | | | |
|---|---|---|---|
| 5,303,952 | 4/1994 | Shermetaro et al. | 280/731 |
| 5,331,124 | 7/1994 | Danielson | 200/61.54 |
| 5,333,900 | 8/1994 | Strahl et al. | 280/731 |
| 5,508,482 | 4/1996 | Martin et al. | 200/61.55 |
| 5,542,694 | 8/1996 | Davis | 280/728.3 |
| 5,627,352 | 5/1997 | Suzuki et al. | 200/61.54 |

*Primary Examiner*—Michael Friedhofer
*Attorney, Agent, or Firm*—Roger A. Johnston

[57] ABSTRACT

The invention herein relates to an automobile steering wheel switch assembly with several individual switches (3) and a support housing (1) located inside the steering wheel for the accommodation of an airbag module, by means of which at least one horn switch (15) can be activated. Inside the steering wheel is a stationary support plate (7), which supports the support housing (1) in a spring-biased, wobbling manner, whereby the support housing (1) has mounted on its side (12) facing the support plate (7) a contact unit (10) with connector contacts (32), the unit having switch guides (20) that contact individual switches (3) by way of connecting lines (35) and the horn switch (15) located on the connecting lines (35, 35a).

10 Claims, 6 Drawing Sheets

AUTOMOBILE STEERING WHEEL SWITCH

CROSS-REFERENCE TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

The invention herein relates to an automobile steering wheel switch comprising several individual switches and a support housing located inside the steering wheel for the accommodation of an airbag module, by means of which at least one horn switch can be activated.

DE Auslegeschrift 2,810,790 discloses a switch unit with a support housing, which is installed on a steering column tube and which accommodates different individual switches, each having its own electrical leads or a separate harness. Each individual switch has spring-like adjoining projections, which are guided in grooves of the support housing and are held in position by means of clip connections. The support housing comprises a spring-biased horn contact, which is connected on the steering column tube side over another line with a crimped-on contact element. The electrical circuit is closed over a ground connection on the steering wheel. During assembly of the steering wheel care must be taken that the connection of the horn contact is not interrupted. The individual electrical connections for the individual switches and the horn contact are relatively expensive and increase the possibilities for errors during assembly and repair of the switch unit.

Furthermore, DE 1,655,117 A1 discloses a steering column switch comprising a switch housing, which accommodates one individual switch as well as an ignition lock. The individual switch is powered by means of a supply line passed through a channel-like hollow space of the switch housing. In order to establish the electrical connection, the steering column switch is provided with a socket member terminating the appropriate supply line, whereby the individual switch has a matching plug member. In addition, a separate ground cable is provided in connection with a ball bearing mounted in a non-rotatable manner on the housing. The ignition lock is connected by means of another plug connection of the appropriate power supply line. The electrical connections require separate supply lines that pass through the steering wheel switch housing and must be installed in the latter, thereby requiring increased assembly efforts.

In order to mount an airbag module in the front central section of a steering wheel, this module is frequently associated with the support housing of the steering column switch. The activation elements for a horn switch are located either in an adjacent area of the airbag module, which is disadvantageous because the horn is not activated in time in critical situations and because the horn-activating element must be located first, or these activation elements are configured as an impact-absorbing steering wheel cap, which covers the airbag module and which is used for activation of the horn switch. This arrangement requires complex wiring of the electrical connections of the horn switch.

BRIEF SUMMARY OF THE INVENTION

The present invention solves the problem of providing a steering wheel switch of the above-described type, which permits a simple adaptation to various switch requirements and offers a compact, cost-effective design.

In accordance with the present invention this problem has been solved in that, inside the steering wheel, a stationary support plate is provided, which supports the support housing in a spring-biased, wobbling manner, whereby the support housing has mounted on its side facing the support plate, a contact unit with connector contacts, the contact unit comprising switch guides that contact individual switches and comprising the horn switch located on connecting lines.

For connection with the electrical system of the automobile, the steering wheel switch, which comprises the individual switches and the horn switch, requires only one supply line or wiring harness that is connected with the steering wheel connector contacts. Additional separate wiring inside the steering wheel switch is unnecessary because the internal connecting lines of the contact unit provide electrical connection. Individual switches, which comply with different switching requirements and come into direct contact with the connecting lines, are located on the switch guides of the contact unit. The horn switch, which is associated with the contact unit, is also connected directly with the connecting lines. Pressing the support housing activates the horn switch in that an impact-absorbing steering cap covering the airbag is pressed. Inasmuch as the support housing is supported in a spring-biased, wobbling manner, the impact-absorbing cap may be pressed at any point, whereby, when the pressure is released, the support housing's return into the original position is ensured. The steering wheel switch comprises various modules, which can be manufactured separately and cost-effectively and can be assembled in compliance with different requirements, thereby creating a highly compact design of the steering wheel switch.

In accordance with an advantageous modification of the present invention the connecting lines of the contact unit are configured as a punch grid embedded in a plastic cover element provided with separating sites at which the connecting lines are connected with each other over exposed crosspieces. During manufacture, the punch grid ensures a safe and easy connection in compliance with the requirements of electrical insulation due to the plastic cover element. The crosspieces define the layout of the punch grid; they separate the connecting lines at the desired site and hold the punch grid in place when it is spray-coated. The separating sites permit a visual inspection of interrupted current paths. The contact unit produced in this manner can be mounted easily and is not sensitive to handling.

Preferably, the plastic cover element has cutouts in the area of the plug pins of the switch guides, the connector contacts and the horn switch, whereby the connecting lines form exposed contact sites. As a result of this, the simple application of contact elements of the most diverse types is ensured.

Preferably, the connector contacts and the switch contacts of the switch guides are configured as plug pins welded to the connecting lines. Therefore, the profiled plug pins can be manufactured easily, associated automatically with the contact sites and attached to the punch grid.

In order to achieve a direct alignment of the components, which are to be assembled or installed, and therefore prevent the looping of lines during installation, the plug pins of the connector contacts point in the direction of the support plate;

and, the plug pins of the switch guides point in the direction of the support housing.

In order to adapt the component height of the individual switches to the component height of the support housing for the airbag module, the switch guides accommodating the individual switches are located on opposing double angle sections of the contact unit. Furthermore, the known arrangement of different individual switches, i.e., to the right and left of the steering wheel, is maintained.

The individual switches should be guided accurately and should fit in the support housing of the steering wheel switch without large intermediate spaces and without requiring adjustments. Therefore, the switch guides preferably comprise a collar surrounding the switch contacts, the collar being provided with a plugging code. The collar surrounding the switch contacts protects the contacts against mechanical damage and assures the desired positioning of the individual switches relative to the support housing of the steering wheel switch.

In accordance with an advantageous modification of the present invention, the support housing is provided on its side facing the support plate with several threaded bushings extending through the contact unit in order to be able to screw the support housing to the support plate. On its side facing the support plate, the contact unit has several domes overlapped by tension springs and exposed in the direction of the support plate. The domes are longer than the threaded bushings and each of the diametrically slotted domes accommodates a horn switch configured as a tip switch. This arrangement ensures a compact design of the steering wheel switch, which contains the wobbling, spring-biased support of the support housing on the support plate as an integral part. The location of the tension springs effects the safe resetting of the horn switch; this is not ensured by the springs contained in the tip switches.

If the tension springs are arranged between the support plate and the contact unit in a pre-tensioned manner, noise-generating vibrations are prevented within the steering wheel switch.

Preferably, the lateral walls of each dome have at least the same height as the associate horn switch, in the activated state; and, the internal guide ribs for fixing the horn switch in position. The base of each dome of the contact unit has at least one insertion hole, into which a pin adjoining the underside of the horn switch is inserted. As a result of this, the domes accommodating the horn switches act as switch movement limiters and thus prevent damage to the tip switches from excessive application of force. Furthermore, the horn switch is fixed in its position.

In order to achieve useful options for the assembly of the individual components of the steering wheel switch, the contact unit has, in the area of each lateral angle, and at a distance thereto, a borehole for receiving a screw for mounting the individual switches and the support housing to the contact unit.

Due to the thin design of the contact unit, there is a risk of vibration noise. In order to counteract this, the contact unit is provided with compensation ribs on its side facing the support housing and/or the support plate. These compensation ribs are thin enough that they will brace themselves in an elastic and/or plastic manner against opposite surfaces, thereby preventing the development of noise caused by the contact unit.

In order to compensate for manufacturing tolerances and heat expansion, the contact unit is provided with at least one tolerance compensation means. This tolerance compensation means is configured as punch grid with an exposed cutout on one side in the area of the angle sections of the contact unit. This arrangement permits the compensation of length and height tolerances, whereby, at the same time, the height location of the individual switches can be affected. In an alternative embodiment, the tolerance compensation is built-in on account of at least one flat area of the contact unit; and the punch grid has an expansion loop in the area of the cutout. This permits the compensation for greater length changes of the contact unit or the support housing. Accommodation of different installation sizes is thus possible by elastic deformation of the contact unit in the area of the expansion loop.

In order to prevent contact of the connecting lines with the support housing in the area of the expansion loop and thus ensure electrical safety, the insulating discs extending beyond the expansion loop are located on one side of the contact unit in the area of the cutout between the connecting lines of the punch grid.

In order to code the switch currents of the contact unit or the individual switches, resistors are interposed between the connecting lines of the contact unit and/or the switch lines in the individual switches.

It is understood that the above-described features, which will be explained in detail hereinafter, can be used not only in the respectively disclosed combination but also in other combinations, without departing from the scope of the present invention.

BRIEF DESCRIPTION OF THE DRAWINGS

The invention will be explained in detail hereinafter by means of an example of embodiment with reference to appropriate drawings. They show.

DETAILED DESCRIPTION OF THE INVENTION

Figure 1:
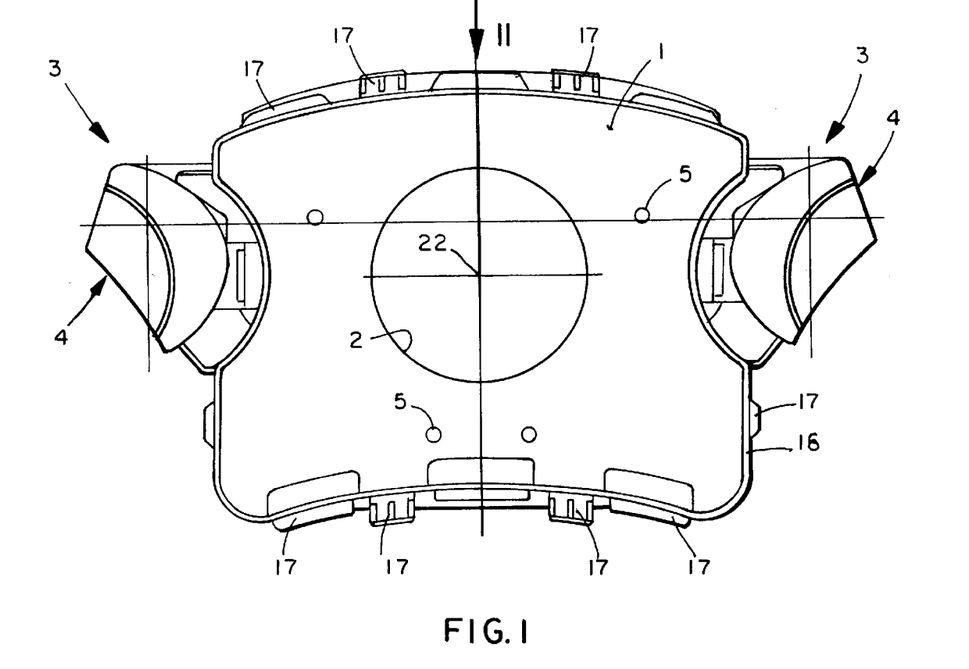
FIG. 1 a plan view of an inventive steering wheel switch.
Figure 2:
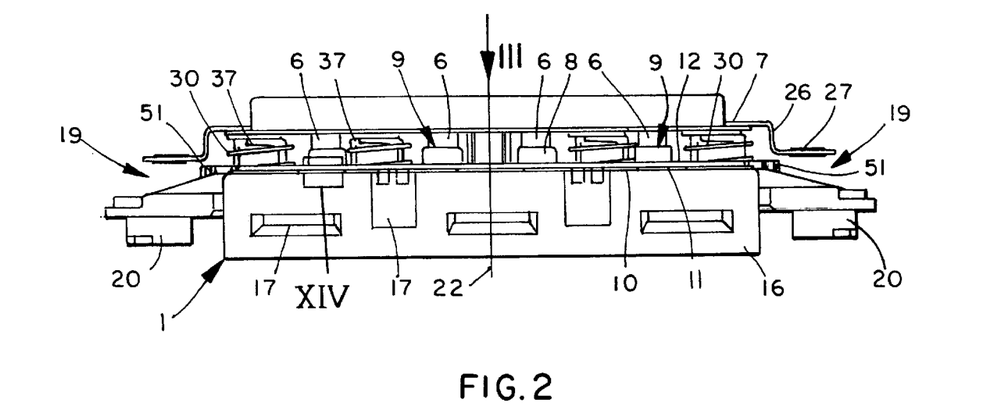
FIG. 2 a view of the illustration in accordance with FIG. 1 in the direction of arrow II, FIG. 3 a view of the illustration in accordance with FIG. 2 in the direction of arrow III, FIG. 4 a plan view of a contact unit of the steering wheel switch in accordance with FIG. 1, FIG. 5 a view of the illustration in accordance with FIG. 4 in the direction of arrow V, FIG. 6 a view of the illustration in accordance with FIG. 5 in the direction of arrow VI, FIG. 7 a view of the illustration in accordance with FIG. 6 in the direction of arrow VII, FIG. 8 an enlarged plan view of the illustration in accordance with FIG. 4 with exposed punch grid, FIG. 9 an enlarged partial view of the illustration in accordance with FIG. 6 along line IX—IX, FIG. 10 an enlarged partial view of the illustration in accordance with FIG. 4 along line X—X, FIG. 11 an enlarged partial view of the illustration in accordance with FIG. 6 along line XI—XI, FIG. 12 an enlarged partial view of the illustration in accordance with FIG. 6 along line XII—XII, FIG. 13 a view of the illustration in accordance with FIG. 6 in the direction of arrow XIII, FIG. 14 an enlarged partial view of the illustration in accordance with FIG. 3 in the direction of arrow XIV, FIG. 15 an enlarged illustration of detail XV of FIG. 7 in an alternative embodiment, FIG. 16 an enlarged partial view of an alternative contact unit in accordance with FIG. 4 in the direction of arrow V, which has been cut along line XVI—XVI of FIG. 17, and FIG. 17 a view of the illustration in accordance with FIG. 16 in the direction of arrow XVII.
Figure 3:
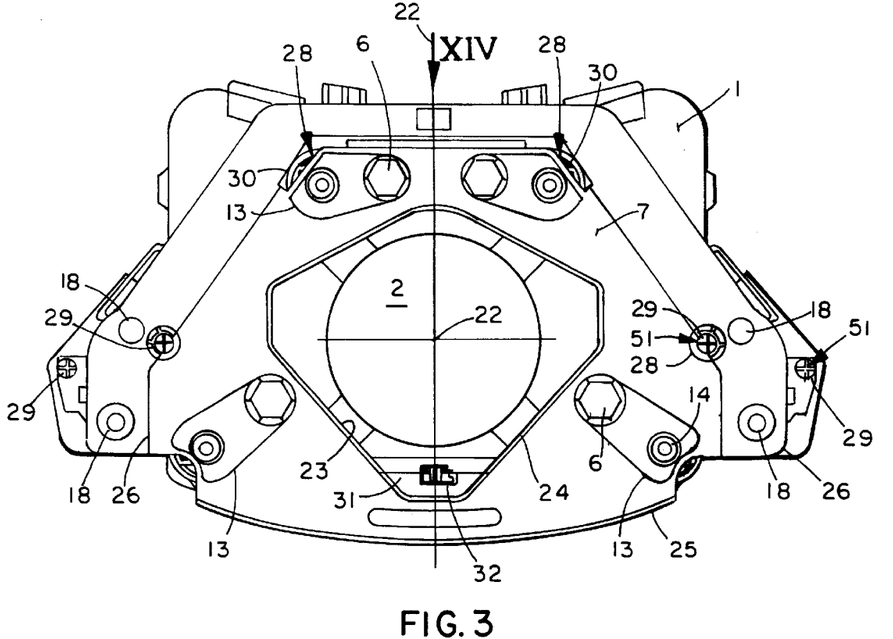
Figure 4:
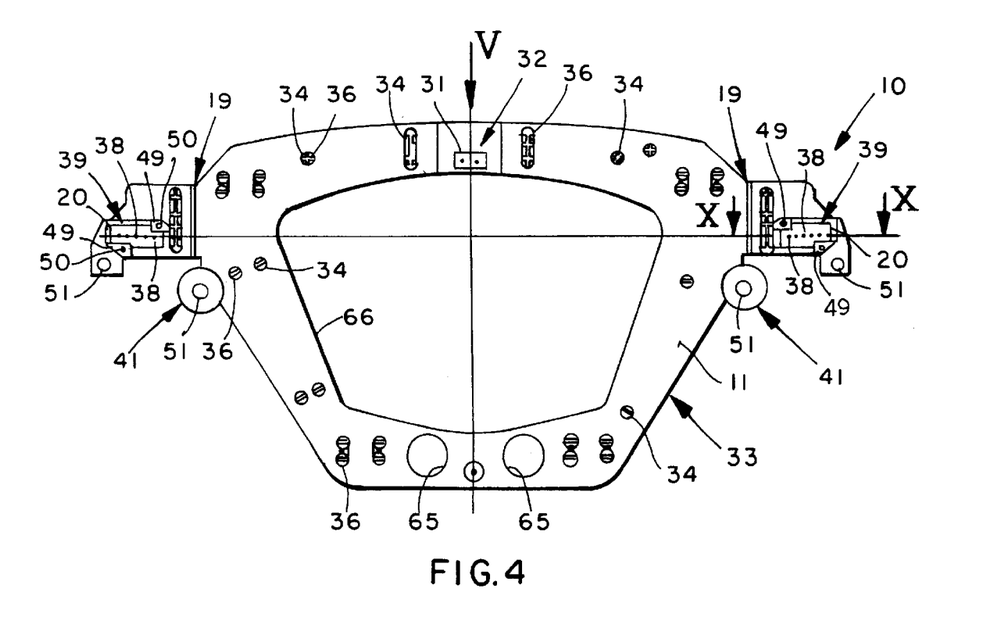

FIG. 1 through FIG. 3 show the steering wheel switch in assembled state. A support housing indicated generally at 1 accommodating a not illustrated airbag module is provided with peripheral rim 16. Support housing 1 has a central circular cutout 2, through which screw means of a not illustrated steering wheel with a not illustrated steering column are accessible. Mounted to the right and left of support housing 1 is an individual switch indicated generally at 3 each, which comprises a two-part operating element indicated generally at 4 having a shape adapted to the design of the not illustrated steering wheel and the airbag module. Adjoining the reverse side of support housing 1 are threaded boreholes 5 for the accommodation of threaded bushings 8, into which spacer screws 6 are screwed until they reach stops indicated generally at 9.

Figure 5:
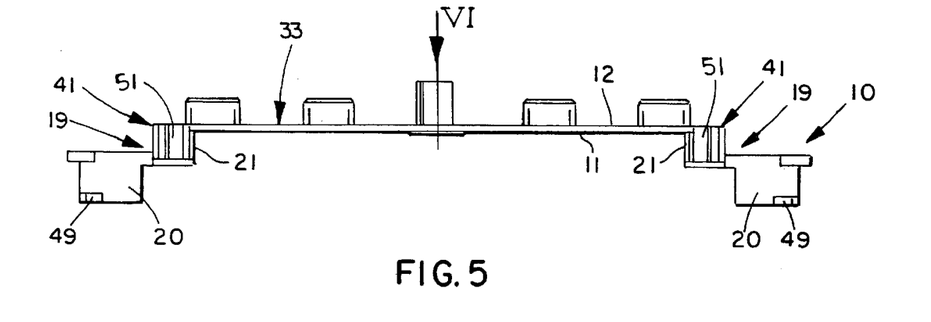
Figure 6:
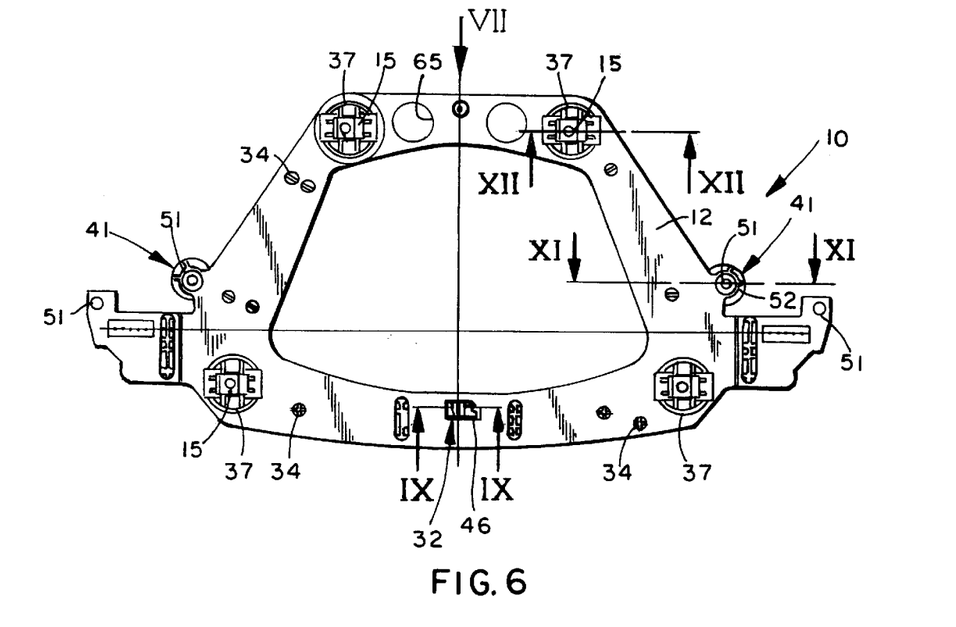
Figure 7:
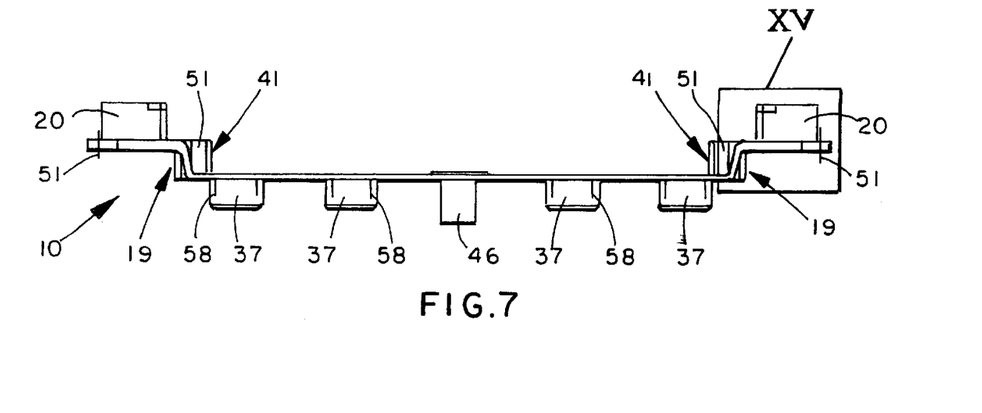

Located between the reverse side of support housing 1 and a support plate 7 is a contact unit 10, one side of which abut:; against the reverse side of support housing 1. Metal support plate 7 is provided with four inlay-sprayed plastic tabs 13, which form a support for spacer screws 6 and a pushrod 14 for activation of an associate horn switch 15, see FIG. 5. Peripheral rim 16 of support housing 1 is provided with adjoining mounting elements 17 for the installation of an impact-absorbing airbag-covering steering wheel cap or steering wheel cover. The steering wheel switch is mounted in a steering wheel or on a stationary support on the steering wheel by means of attachment or central boreholes 18 of support plate 7.

Contact unit 10 has lateral angle sections indicated generally at 19 with central crosspieces 21 extending from contact unit 10 parallel to peripheral rim 16 in the direction of support housing 1. Each angle section 19 supports a switch guide 20 projecting through support housing 1. Peripheral rim 16 of support housing 1, central crosspiece 21 of angle section 19 and switch guides 20 are aligned parallel with respect to axis 22 of the steering column.

Support plate 7 comprises a central cutout 23 with edges 24, which are angled in the peripheral area to provide reinforcement. Cutout 23 is provided with a shaped area 31, through which extend connector contacts 32 of contact unit 10. Connector contacts 32 permit the connection of leads with the electrical system of the motor vehicle. The exterior edge of support plate 7 is provided with additional peripheral reinforcements or flanges 25.

The trapeze-shaped part of the support plate 7 has two opposing 90° bent edges, whereby the first bent edge 26 extends parallel to axis 22 of the steering column and the second bent edge 26 extends perpendicular to the first bent edge 26. Support plate 7 is provided with punched-out sections 28, through which screws 29 for mounting individual switches 3 may be accessed and which create free space for tension springs 30, thereby achieving the immediate resetting of horn switch 15.

FIG. 4 through FIG. 7 show various views of contact unit 10. On side 11 facing support housing 1, it is possible to see separating sites 34 recessed in a plastic cover element indicated generally at 33 covering contact unit 10, partial connecting lines 35, 35a and crosspieces 36 connecting these connecting lines. The shape of separating sites 34 is adapted to the position of crosspieces 36, which are to be separated, whereby separating site 34 may be circular or have the shape of an elongated hole. Visible at the top in the center is the reverse side of connector contacts indicated generally at 32 embedded in a recess indicated generally at 37 in plastic element 33. Contacts 32 are preferably laser-welded to the exposed connecting lines 35 (see FIG. 9). To the right and left of contact unit 10, a switch guide 20 is located on each of the double angle sections 19 extending in the direction of the steering wheel.

Plastic element 33 is also provided with separating sites 34 on side 12 of contact unit 10 facing support plate 7. At the sites, where no separation of connecting lines 35, 35a occurs, at which, however, connecting lines 35, 35a are exposed on both sides 11, 12 of contact unit 10, appropriate tools (not shown) are employed to hold connecting lines 35, 35a during the spraying process. In addition, connector contacts 32 or four domes 37, each accommodating a horn switch, are located at these sites. Inside plastic elements 33, connecting lines 35 extend from connector contacts 32 to switch contacts 39 configured as plug pins 38 located in switch guides 20. Along connecting lines 35, 35a configured as a punch grid, connecting lines 35 exposed at four points inside each dome 37 form contact sites indicated generally at 40 for horn switches 15. Also, positioning elements indicated generally at 41 having a borehole 51 each are configured as an integral part of plastic element 33 of contact unit 10.

Lateral walls 54 of the four domes 37 are provided with adjoining clamping ribs 58, each being overlapped by a tension spring 30. The internal diameter of tension spring 30 and the tips of the outward-pointing tips of clamping ribs 58 are adjusted relative with respect to each other in such a manner that tension spring 30 is slightly tensioned after being slid onto dome 37.

In order to fix contact unit 10 in position on support housing 1, individual switches 3 are mounted by screw means extending through boreholes 51 of positioning elements 41, whereby support housing 1 is located between individual switches 3 and contact unit 10. Support plate 7 is connected with the support housing by means of spacer screws 6 penetrating two holes 65 and central opening 66 of contact unit 10. Tension springs 30 are positioned between contact unit 10 and support plate 7 in a pre-tensioned manner so that the wobbling support of support housing 1 with mounted contact unit 10 on support plate 7 is ensured.

Figure 8:
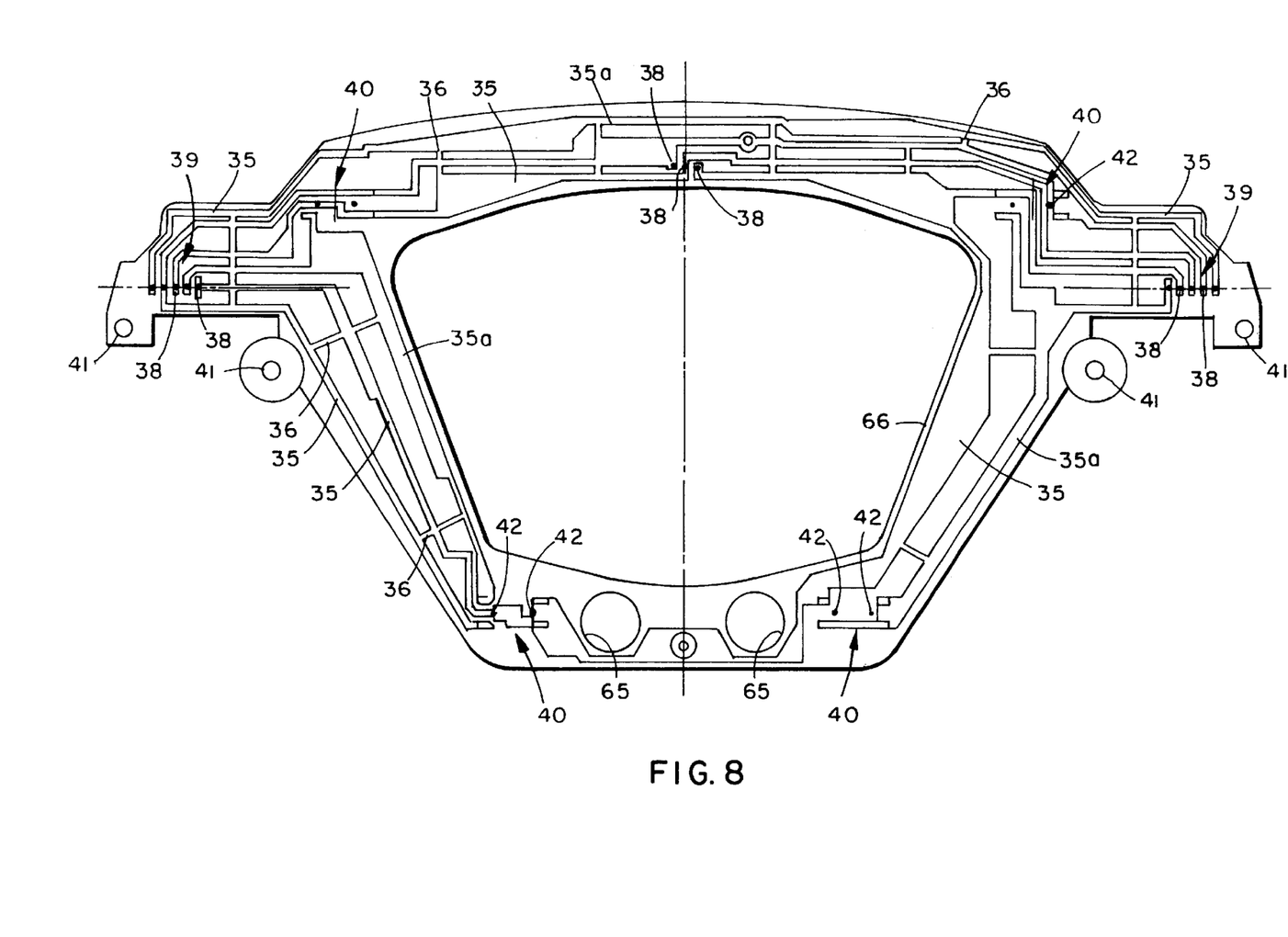

FIG. 8 is a view of connecting lines 35, 35a configured as a punch grid without angle sections 19. For reasons of clarity there are no shaded areas. Connecting lines 35, 35a extend over the entire contact unit 10, starting at the three plug pins 38 of connector contacts 32. Some of the connecting lines terminate at switch contacts 39, where respectively five plug pins 38 are provided; and, some of the connecting lines proceed from there and branch out. A few connecting lines 35a extend only between switch contacts 39 or between switch contacts 39 and contact sites 40 for horn switches 15. For each horn switch 15 there are contact sites 40 having four areas of connecting lines 35, 35a for electrical connection. The central area of each contact site 40 is provided with insertion holes 42 for mounting horn switch 15, said holes being created at the time connecting lines 35, 35a are punched out or at the time when contact unit 10 is sprayed. Crosspieces 36 are provided between connecting lines 35 to give the punch grid a sturdy shape and allow it to be handled as one part. These crosspieces 36 hold the connecting lines. Depending on electrical requirements, crosspieces 36 are separated after being spray-coated.

Figures 9, 10:
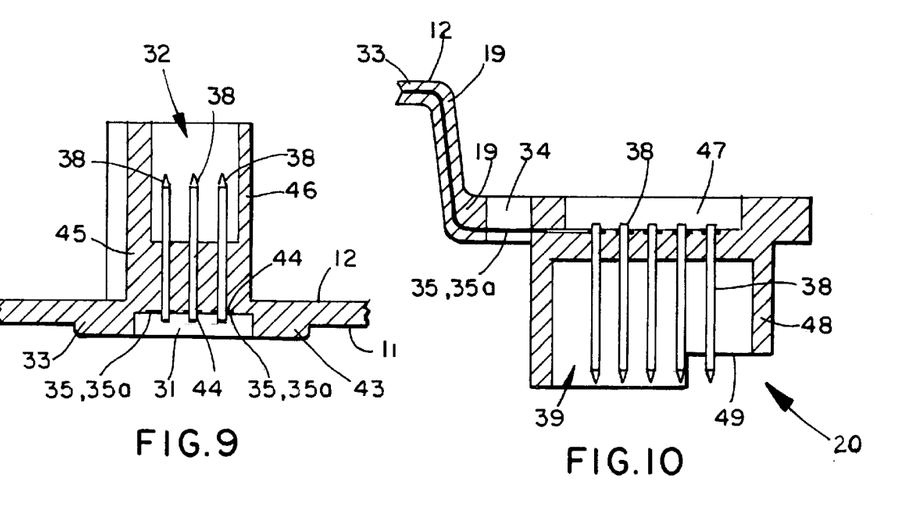

FIG. 9 shows plug pins 38 of connector contacts 32. Side 11 of contact unit 10 facing support housing 1 has a thicker portion 43 in which recess 31 is provided. Inside recess 31, connecting lines 35, 35a are exposed toward side 11. Insertion holes 44 for plug pins 38 are punched into connecting lines 35, 35a, the pins being inserted in the holes 44. Inside recess 31, plug pins 38 are welded to connecting lines 35, 35a. On side 12, opposite recess 31, is an adjoining plug socket 45 for the mechanical installation of plug pins 38, said socket holding said pins over a large part of their length. The portion of plug pins 38 extending freely beyond plug socket 45 is enclosed by a protective plug collar 46 provided with a plugging code.

Referring to FIG. 10, switch guide 20 is connected with contact unit 10 over two angle sections 19, whereby a separating site 34 exposing connecting lines 35, 35a is located between angle sections 19 close to switch guide 20 and switch guide 20. Furthermore, connecting lines 35, 35a are exposed in the direction of side 12 of contact unit 10 in the area of switch guide 20 in a recess 47 so that plug pins 38 of switch contact 39 can be connected with connecting lines 35, 35a in said recess. Plug pins 38 extend toward side 11 of contact unit 10 into a collar 48 of switch guide 20, which has two diagonally opposed protrusions 49 acting as plugging code (see also FIG. 4). For manufacturing reasons, holes 50 are provided in the area of protrusions 49. Plug pins 38 in switch guides 20 are aligned opposite plug pins 38 of connector contacts 32, as a result of which the contact unit is connected with the automobile wiring system toward the automobile side and with individual switches 3 toward the driver side. Therefore, plug contacts 38 are welded to connecting lines 35 on both sides of the punch grid.

Figure 11:
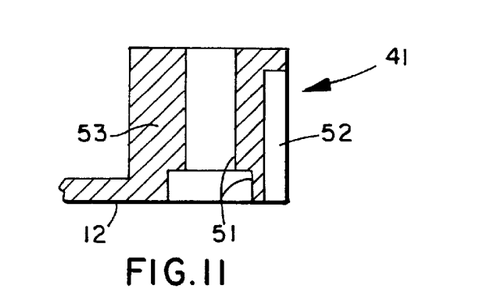

FIG. 11 shows positioning element 41 consisting of sleeve 53 provided with reinforcement ribs 52, whereby sleeve 53 has a borehole 51 configured as a variable or stepped borehole. The large diameter of borehole 51 is congruent with side 12 of contact unit 10.

Figure 12:
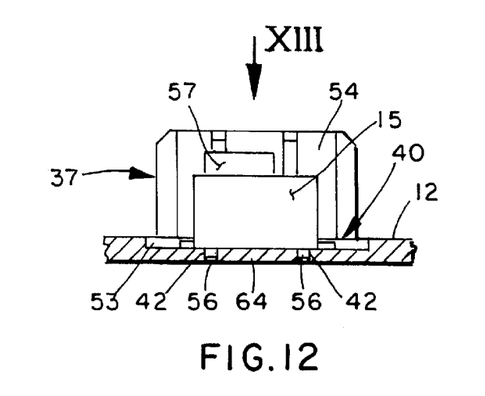
Figure 13:
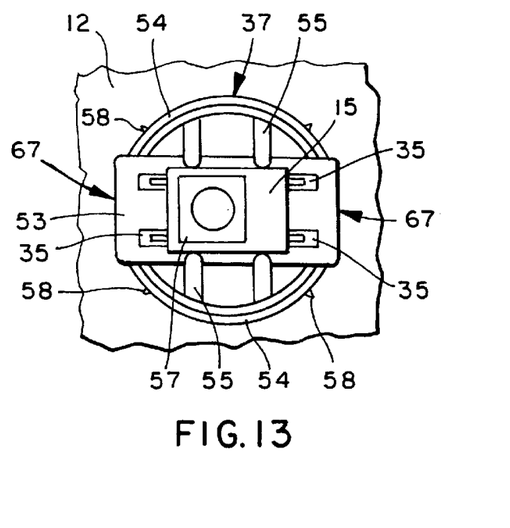

Referring to FIGS. 12 and 13, four annular and slotted domes 37 are sprayed on side 12 of contact unit 10, whereby said domes indicated generally at 37 have in the area of a slot indicated generally at 67, a recess 53 in which contact sites 40 for horn switches are exposed. From lateral walls 54 of each dome 37 extend four inward-directed guide ribs 55, between which horn switch 15 is accommodated with a minimum of play. Inside recess 53 in base 64 of the dome there are two insertion holes 42 with different diameters at a distance from each other, these holes permitting a predetermined position of horn switch 15 because horn switch 15 has locating pins 56 on its underside. The upper edge of a push-button 57 of horn switch 15 is located below the upper edge of lateral walls 54 of dome 37, as a result of which horn switch 15 is protected against damage during the: assembly of the steering wheel switch. Push-buttons 57 are activated by means of pushrods 14 adjoining support plate 7 and extending into dome 37.

Figure 14:
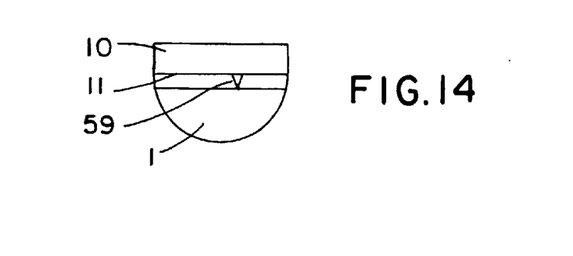

FIG. 14 shows on side 11 of contact unit 10 a compensation rib 59, which abuts against support housing 1 in a slightly pre-tensioned manner. This prevents noise caused by vibrations of contact unit 10.

Figure 15:
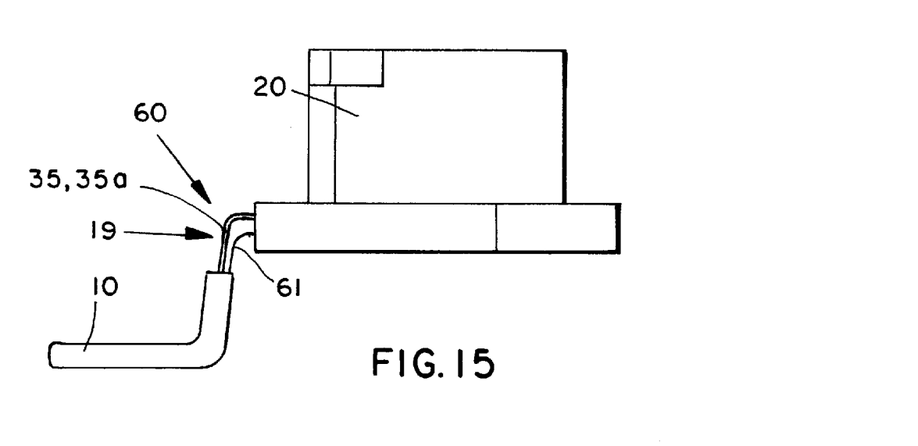
Figure 16:
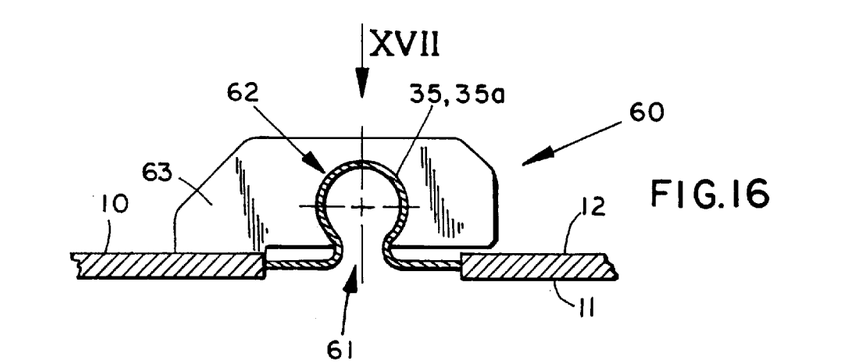
Figure 17:
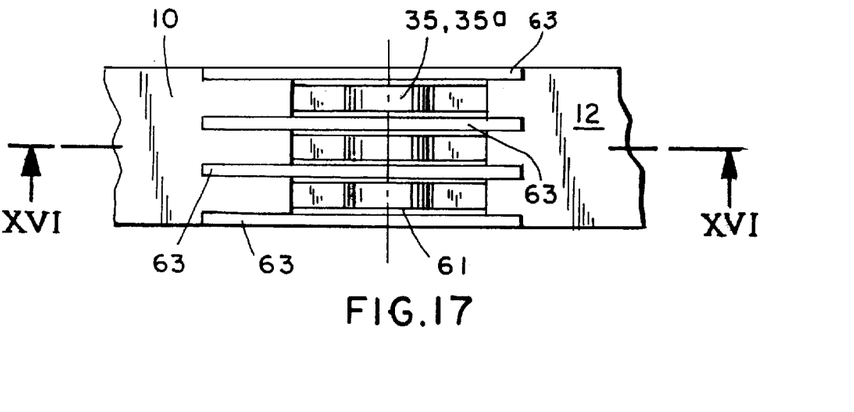

In accordance with FIG. 15 tolerance compensation means indicated generally at 60 of contact unit 10 are located in angle sections 19 directly in front of switch guide 20. A cutout 61 exposes the punch grid on both sides so that switch guide 20 offers two degrees of latitude. FIG. 16 and FIG. 17 show an alternative embodiment, in which cutout 61 is provided in a flat area of contact unit 10. Connecting lines 35, 35a each have an expansion loop indicated generally at 62 bent out of the plane of contact unit 10, the expansion loop offering degrees of latitude on all planes. To prevent the connecting lines from coming into contact with each other in the area of expansion loop 62, side 12 of contact unit 10 has adjoining a plurality of insulating discs 63, which are higher than expansion loop 62 and longer than cutout 61. Insulating discs 63 are located on side 12 of contact unit 10 so that contact unit 10 may be collapsed without jamming, thereby preventing contact with expansion loop 62.

The operation of the system after activating horn switch 15 and individual switches 3 is described hereinafter. Individual switches 3 are located between the spokes of the steering wheel and are easily accessible and visible to the driver. Depending on specific requirements, they are configured as tip and/or click-stop switches. When the tip and/or click-stop switches are activated, a current path inside the steering wheel switch is closed temporarily or permanently. The electrical signal is sent over connecting lines 35, 35a to connector contacts 32 and from there to the automobile wiring system. Because only three connector contacts 32 are available with a plurality of different possible and desired switch operations, the electrical signal must be coded by means of coding elements such as resistors and the like. Horn switch 15 is activated by pressing the impact-absorbing cap covering the airbag module at any point in the direction toward the steering column.

By way of the airbag module, support housing 1 with stationary contact unit 10 is moved in the direction toward support plate 7, against the action of tension springs 30. Pushrod 14 moves inside dome 37 and acts on button 57 of horn switch 15. Before dome 37 abuts against support plate 7, the current path of horn switch 15 has been closed, whereby button 57 of horn switch 15 has additional available room for movement at the time of abutment of dome 37 against support plate 7. As a result of this, damage to horn switch 15 is prevented because the great stopping force need not be absorbed by horn switch 15. After releasing the airbag module, it and support housing 1 are pushed away from support plate 7 due to the action of tension spring 30; pushrod 14 clears button 57 of horn switch 15 and the current path is interrupted. Main horn switches 15 are associated with connecting lines 35, 35a of the punch grid in such a manner that, regardless of which horn switch 15 is activated, the current path is closed for horn activation and the horn is sounded.

What is claimed is:

1. A switch assembly for use on an automobile steering wheel, said assembly comprising a plurality of accessory switches and a support housing for mounting inside the steering wheel for accommodating an airbag module, at least one horn switch, a stationary support plate, which supports the support housing in a spring-biased, wobbling manner, whereby the support housing has mounted on a side facing the support plate a contact unit with connector contacts, said contact unit comprising switch guides that contact individual ones of said plurality of switches by way of connecting lines, wherein said at least one horn switch is located on said connecting lines, wherein said contact unit has thereon a dome open in a direction of the support plate and which accommodates said at least one horn switch.

2. Steering wheel switch assembly in accordance with claim 1, characterized in that the contact unit is provided on the side facing the support plate with a plurality of said domes overlapped by tension springs, whereby each of said plurality of domes accommodates a horn switch configured as a tip switch.

3. Steering wheel switch assembly in accordance with claim 1, characterized in that the tensions springs are positioned between the support plate and the contact unit in a pre-tensioned manner.

4. Steering wheel switch assembly in accordance with claim 1, characterized in each of said domes has lateral walls at least the same height as the associate horn switch in an activated state and are provided with internal guide ribs in order to fix the horn switch in position.

5. Steering wheel switch assembly in accordance with claim 1, characterized in that each of said domes of said contact unit has a base with at least one insertion hole, into which can be inserted a pin.

6. Steering wheel switch assembly in accordance with claim 1, characterized in that the contact unit is provided with compensating ribs.

7. Steering wheel switch assembly in accordance with claim 1, characterized in that the contact unit is associated with at least one tolerance compensation means.

8. Steering wheel switch assembly in accordance with claim 7, characterized in that the tolerance compensation means is configured as a cutout exposed on one side of the contact unit.

9. Steering wheel switch assembly in accordance with claim 7, characterized in that the tolerance compensation means is provided with at least one cutout in a flat area of the contact unit, and an expansion loop in the area of the cutout.

10. Steering wheel switch assembly in accordance with claim 9, characterized in that, in the area of the cutout, insulating discs project beyond the expansion loop and are located on one side of the contact unit.

* * * * *